United States Patent
Still

(10) Patent No.: US 10,414,496 B1
(45) Date of Patent: Sep. 17, 2019

(54) APPARATUS AND SYSTEM FOR MULTIPLE TOWED TARGETS

(75) Inventor: Tony Still, Huntsville, AL (US)

(73) Assignee: United States of America as represented by the Secretary of the Army, Washington, DC (US)

(*) Notice: Subject to any disclaimer, the term of this patent is extended or adjusted under 35 U.S.C. 154(b) by 4313 days.

(21) Appl. No.: 11/395,509

(22) Filed: Mar. 31, 2006

(51) Int. Cl.
*B64D 3/02* (2006.01)

(52) U.S. Cl.
CPC ..................... *B64D 3/02* (2013.01)

(58) Field of Classification Search
USPC ...... 244/1 TD, 3, 135 A; 114/244, 249, 253, 114/254
See application file for complete search history.

(56) References Cited

U.S. PATENT DOCUMENTS

| | | | | |
|---|---|---|---|---|
| 2,848,179 A * | 8/1958 | Troxell et al. | ..................... | 244/3 |
| 3,159,806 A * | 12/1964 | Piasecki | ............................ | 340/3 |
| 4,428,583 A * | 1/1984 | Feagle | ........................ | 273/348.1 |
| 6,913,224 B2 * | 7/2005 | Johansen | .......................... | 244/3 |

* cited by examiner

*Primary Examiner* — Derrick R Morgan
(74) *Attorney, Agent, or Firm* — Michael K. Gray

(57) ABSTRACT

A secondary cable connected to a tow reel connects a secondary tow target with a primary tow target. The primary tow target has a mother tow reel positioned at its center of gravity. The mother tow reel is connected to a primary cable that connects the primary tow target to an aircraft. The primary tow target is provided with a pair of lugs positioned on the primary tow target such that an axis line extends through the pair of lugs and through the center of gravity of the primary tow target. A slide ring that is slidable along a cable yoke is attached to the pair of lugs. The slide ring is connected to the secondary cable such that a line of force from the secondary cable is constantly directed through the center of gravity of the primary tow target allowing for the stable aerodynamic flight of the towing aircraft.

10 Claims, 8 Drawing Sheets

APPARATUS AND SYSTEM FOR MULTIPLE TOWED TARGETS

The invention described herein may be manufactured, used and licensed by or for the US Government for governmental purposes without payment of any royalties thereon.

BACKGROUND OF THE INVENTION

I. Field of the Invention

The present invention pertains to a target apparatus and more particularly to a towed target apparatus.

II. Discussion of the Background

In the past, targets have been towed behind a remotely-controlled aircraft to simulate enemy aircraft for ground missile and gunnery practice. When more than one target is towed behind an aircraft, the use of separate tow cables for each target has proven to be undesirable because of interference between tow cables. Attempts have been made to tow the targets in tandem (a primary target towing a secondary towed target), but these attempts have failed because the coupling between the primary target and the secondary target has resulted in the unstable flight of the aircraft.

SUMMARY OF THE INVENTION

It is therefore an object of this invention to tow multiple targets behind a towing aircraft.

It is yet another object of the present invention to tow multiple targets behind a towing aircraft in an aerodynamically stable manner.

These and other valuable objects are achieved by a tow system having a primary tow target (i.e., a first aerodynamic object) and a secondary tow target (i.e., a second aerodynamic object).

The primary tow target is an apparatus for towing behind a powered towing mechanism, e.g., an aircraft in a fluid medium. The primary target has an aerodynamically shaped body and includes a mother tow reel that is positioned at the center of gravity of the primary target. A cable is connected to the mother tow reel. A skin surface forms the aerodynamically-shaped body of the primary target and a slot formed in the skin allows the cable to extend therethrough so as to connect the primary target with the aircraft. A first lug and a second lug are positioned on the primary target such that an axis line goes through the first and second lugs and the center of gravity of the primary target. The first and second lugs are rotatable on the axis line.

A cable yoke is connected to the first and second lugs. A slide ring is slidable along the cable yoke. A second cable is connected to the slide ring with the second cable being connected to an aerodynamically-shaped secondary towed apparatus or secondary tow target. The secondary tow target has a tow reel positioned at its center of gravity. The tow reel of the secondary tow target is connected to the second cable such that even with lateral movement of the secondary tow target, a line of force is constantly directed through the second cable toward the center of gravity of the primary target.

In operation, the secondary tow target is launched from the aircraft prior to launching the primary tow target. Launching of the respective tow targets is accomplished by first reeling the secondary target out behind the primary target and then reeling the primary target out behind the aircraft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
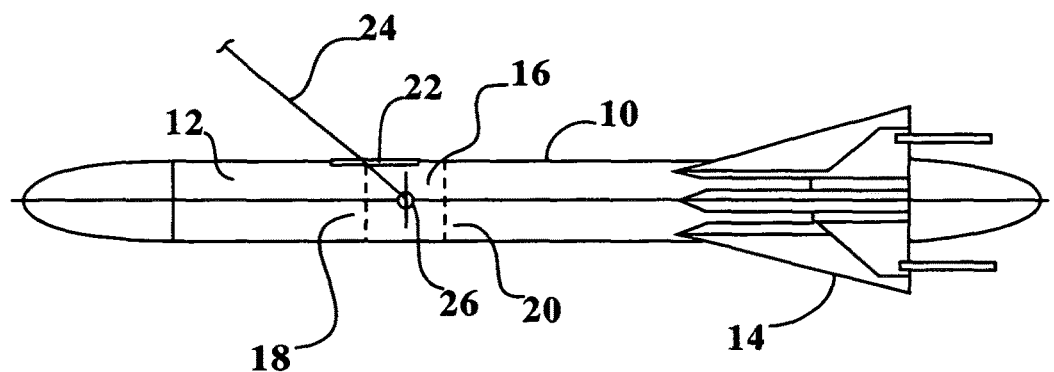
FIG. 1 is a side view of a primary tow target according to the present invention.

With reference to FIG. 1, a primary tow target 10 according to the present invention has skin 12 that forms the body of the tow target 10. The tow target 10 has an aerodynamic shape (e.g., the tow target is in the shape of a missile). Fins 14 are provided at the rear of the primary tow target. A mother tow reel 16 is situated in the interior of the tow target with the front and aft portions of tow reel 16 being identified by broken lines 18, and 20, respectively. An aperture or slot 22 in the skin of the primary tow target allows a cable 24 (an aircraft connecting cable) to be reeled from tow reel 16 as the primary tow target is deployed from a towing aircraft. The tow reel 16 is situated within the center of gravity 26 of the primary tow target 10. The slot 22 is wide and long enough so that the cable 24 does not touch the skin of the primary tow target when the primary tow target 10 has been launched from the aircraft.

Figure 2:
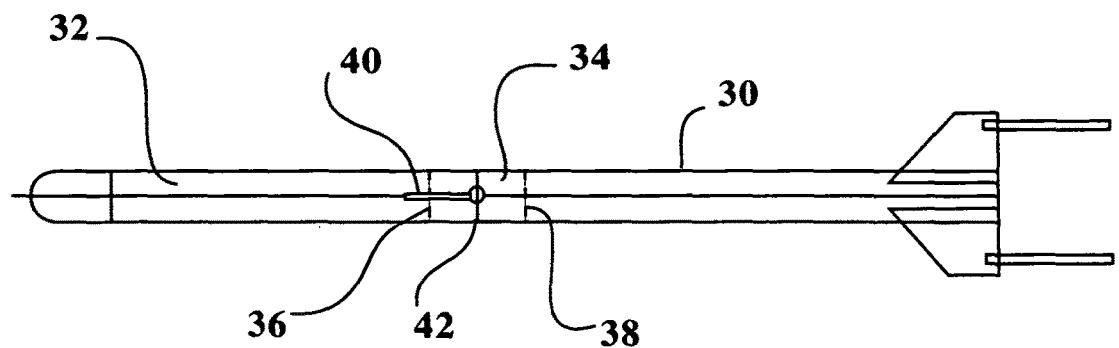
FIG. 2 is a top, view of a secondary tow target according to the present invention.

In FIG. 2, an aerodynamically shaped secondary tow target 30 according to the present invention has a skin 32 that forms the body of the secondary tow target. A tow reel 34 is positioned within the center of gravity 42 of the secondary tow target 30. The front and aft portions of tow reel 34 are identified by broken lines 36 and 38, respectively. A slot 40 for providing cable access to the tow reel 34 is provided in the skin 32 of the secondary tow target 30.

Figure 3:
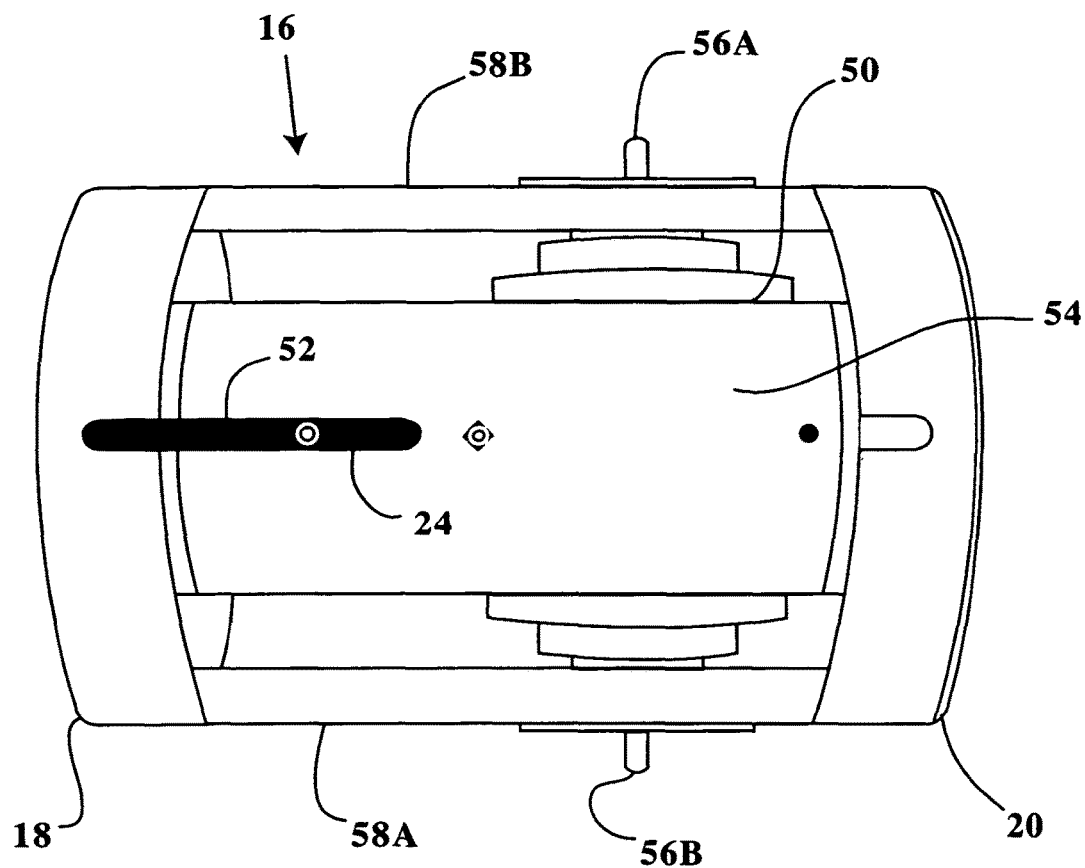
FIG. 3 is a perspective illustration of the tow reel of the primary tow target.

In FIG. 3, the mother tow reel 16 of the primary tow target has a spool 50 on which the cable 24 is wound. The cable 24 could be, for example, 600 feet of 0.065 inch diameter Zylon™ towline. Cable 24 is used to reel the target out behind a towing aircraft upon the launch of the primary target. A slot 52 is provided on spool cover 54 of the tow reel 16. The front 18 and aft regions of the tow reel 16 are attached to the skin 12 of primary target 10 in such a manner that slot 52 is aligned with slot 22 on the skin of primary target 10 (FIG. 1). This arrangement allows the cable to easily unwind from the tow reel 16 as the primary tow target is deployed from an aircraft. Still with reference to FIG. 3, tow reel 16 has a pair of lugs or ears 56A, 56B that are rotatably mounted opposite one another on opposite sides of the tow reel. The lugs protrude laterally from the skin of the primary target 10. (See FIG. 6).

Figure 4:
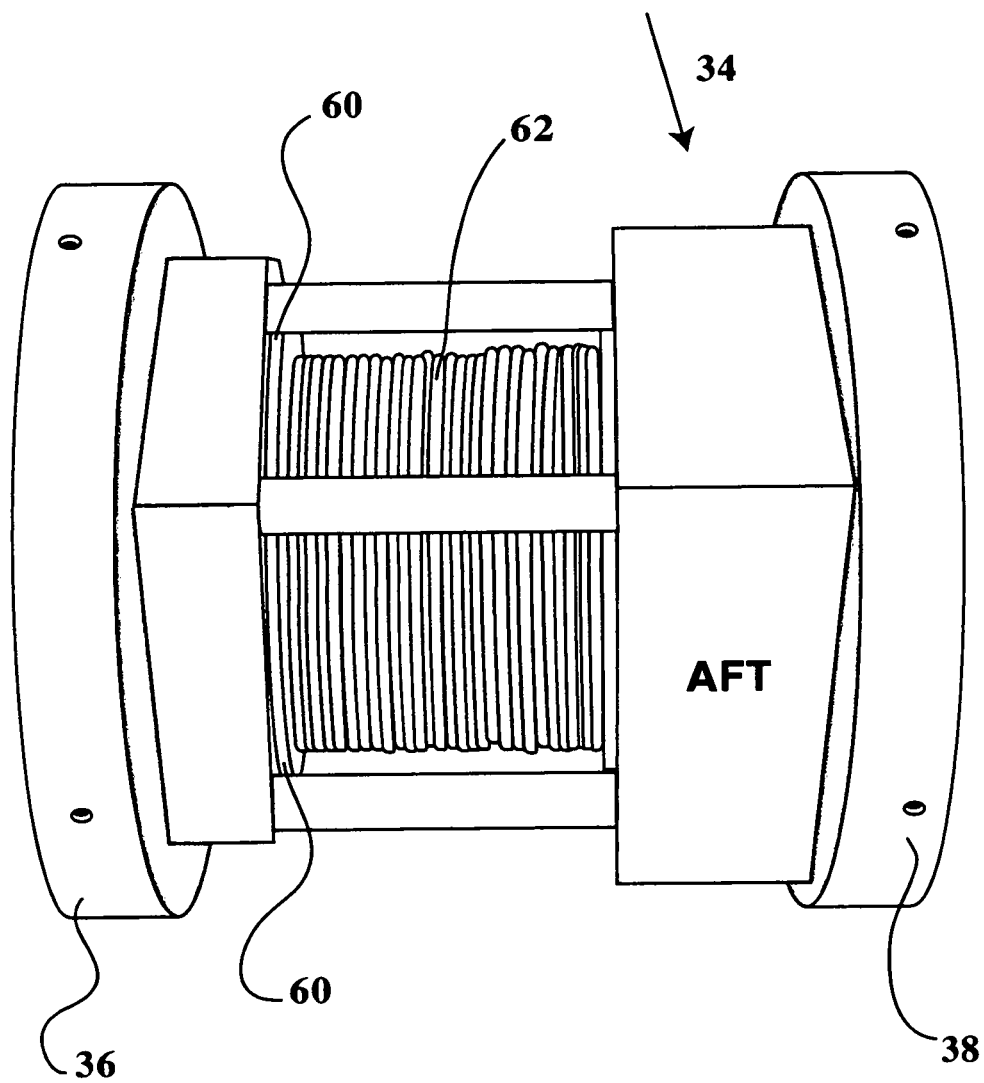
FIG. 4 is a perspective illustration of the tow reel of secondary tow target.

Referring to FIG. 4, the tow reel 34 of secondary tow target 30 is provided with a spool 60 for housing a cable 62 that connects the secondary tow target 30 to the primary tow target 10. The cable 62 could be, for example, 60 feet of 0.065 inch diameter Zylon™ towline. The front 36 and aft 38 regions of the tow reel 34 are attached to the skin 32 of the secondary tow target (FIG. 2). The slot 40 is wide and long enough so that the cable 62 does not touch the skin 32 of the secondary tow target after the secondary tow target 30 has been launched and is being towed behind the aircraft.

Figure 5:
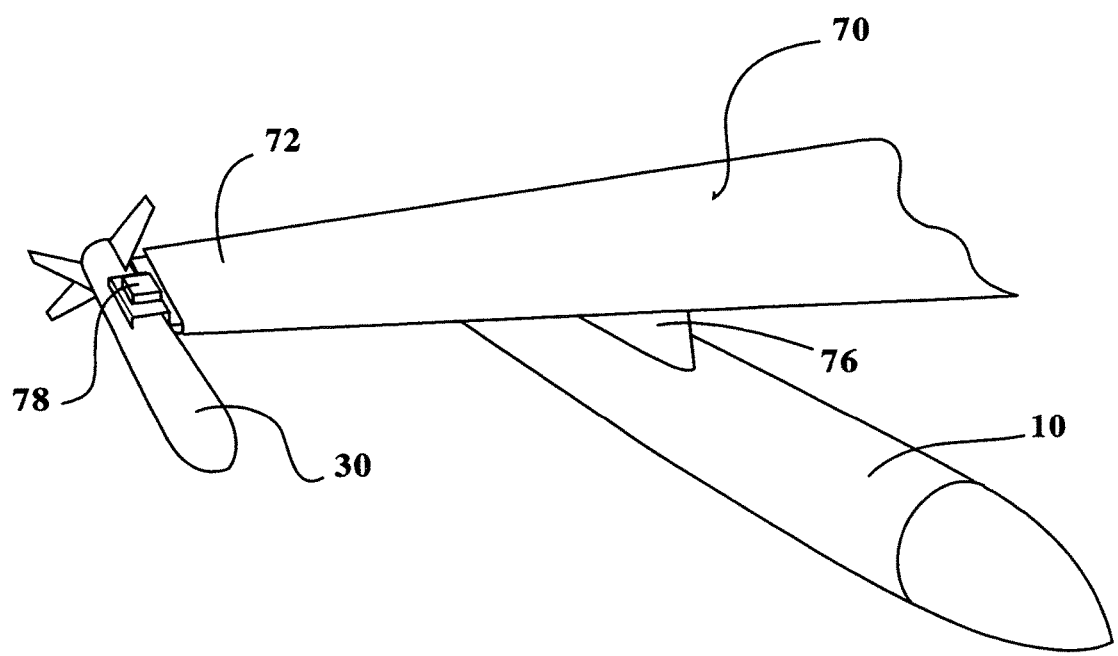
FIG. 5 is perspective illustration of a primary tow target and a secondary tow target mounted on an aircraft wing.

In FIG. 5, primary tow target 10 is mounted under the wing 70 of an aircraft and launches from tow launcher 76 which is, for example, a standard MQM-107 tow launcher. Secondary tow target 30 is mounted to a wingtip launcher 78 on the wingtip 72 of wing 70.

Figure 6:
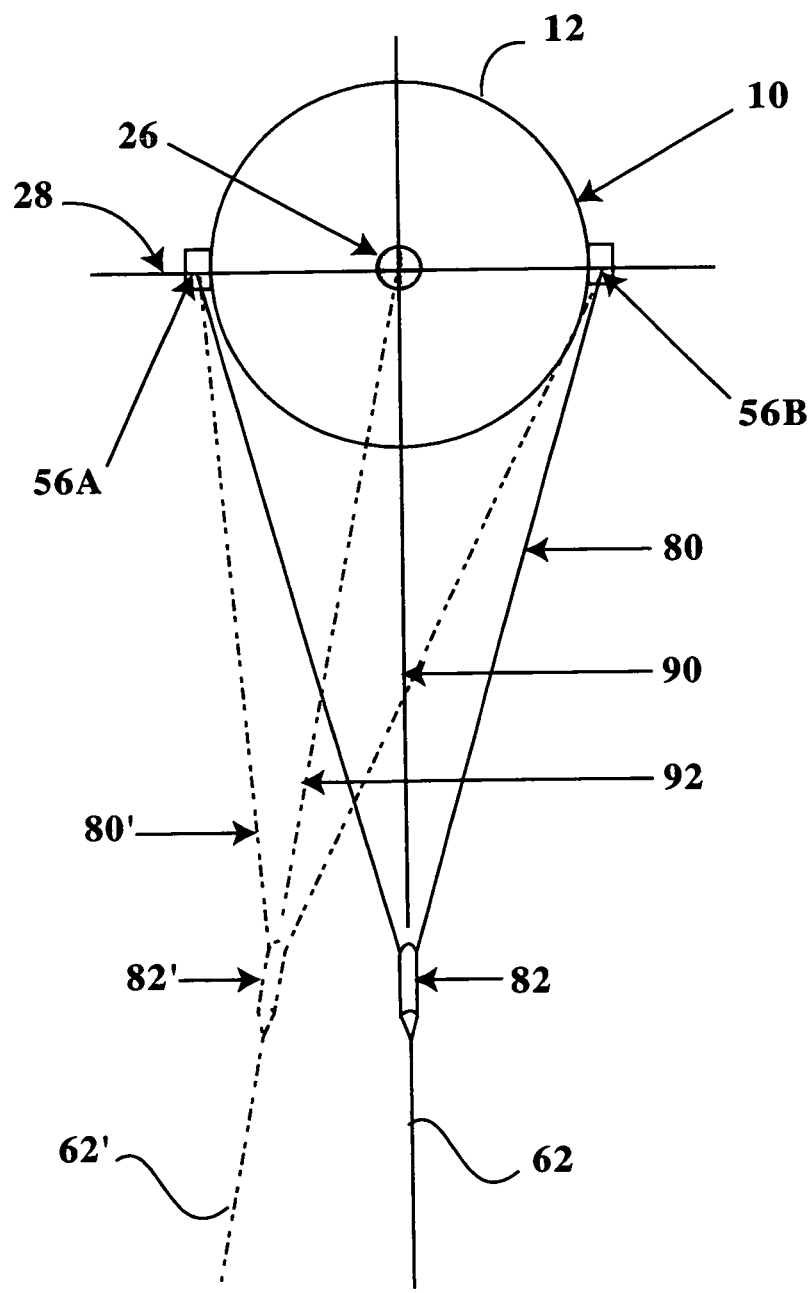
FIG. 6 illustrates how the lateral lugs and yoke mechanism of the primary tow target allow the line of force resulting from the cable connecting the primary tow target with the secondary tow target to be always directed through the center of gravity of the primary tow target.

With reference to FIG. 6, a cutaway view of the primary tow target 10 shows lug 56A and lug 56B positioned on opposite sides of the primary target. An axis line 28 extends through the lugs 56A, 56B and through the center of gravity 26 of the primary tow target. The lugs are rotatable around the axis line 28. A cable yoke 80 which is a single-piece of cable is attached to lugs 56A and 56B. Cable yoke 80 extends through a slider ring 82 in such a manner that the slider ring can slide over the cable. The length of the cable yoke is chosen so as not to make contact with the fins located at the rear of the primary tow target 110. The slide ring is, for example, a standard steel chain link. The slider ring connects to cable 62 which connects the primary tow target 10 to the secondary tow target 30. A line of force 90 extends from the cable 62 through slider ring 82 and through the center of gravity 26.

When the secondary target moves in a lateral manner, such movement will cause the slider 82 to slide along the cable yoke so that the slider ring moves to a new orientation along the length of cable yoke 80. Broken line 80' (FIG. 6) represents an example of the changed position of cable yoke 80 as lateral forces are exerted on it by the movement of secondary tow target 30. However, even with the movement of the secondary tow target 30, a line of force 92 extends from cable 62' (i.e., the new position of cable 62) and through slider ring 82' (i.e., the new position of slider ring 82) and through the center of gravity 26 of the primary tow target.

Figure 7:
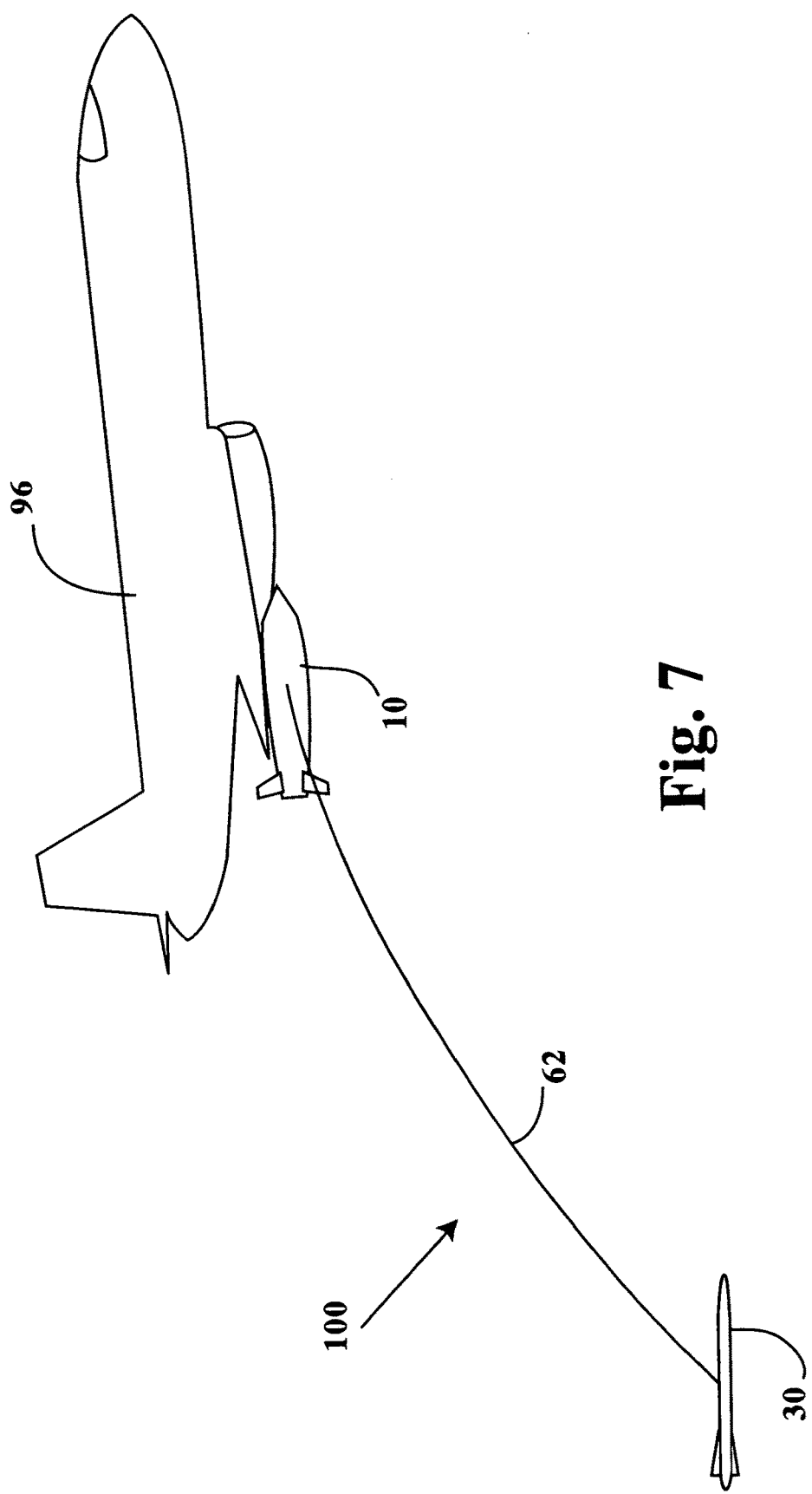
FIG. 7 is a perspective illustration of the system of the present invention with the secondary tow target having been deployed from the aircraft and the primary tow target still being mounted to the aircraft.

In FIG. 7, a secondary tow target 30 is shown moments after it has been launched from aircraft 96. The secondary tow target 30 is connected to primary tow target 10 by cable 62. In FIG. 7, primary tow target 10 is awaiting launch and is still mounted to aircraft 96.

Figure 8:
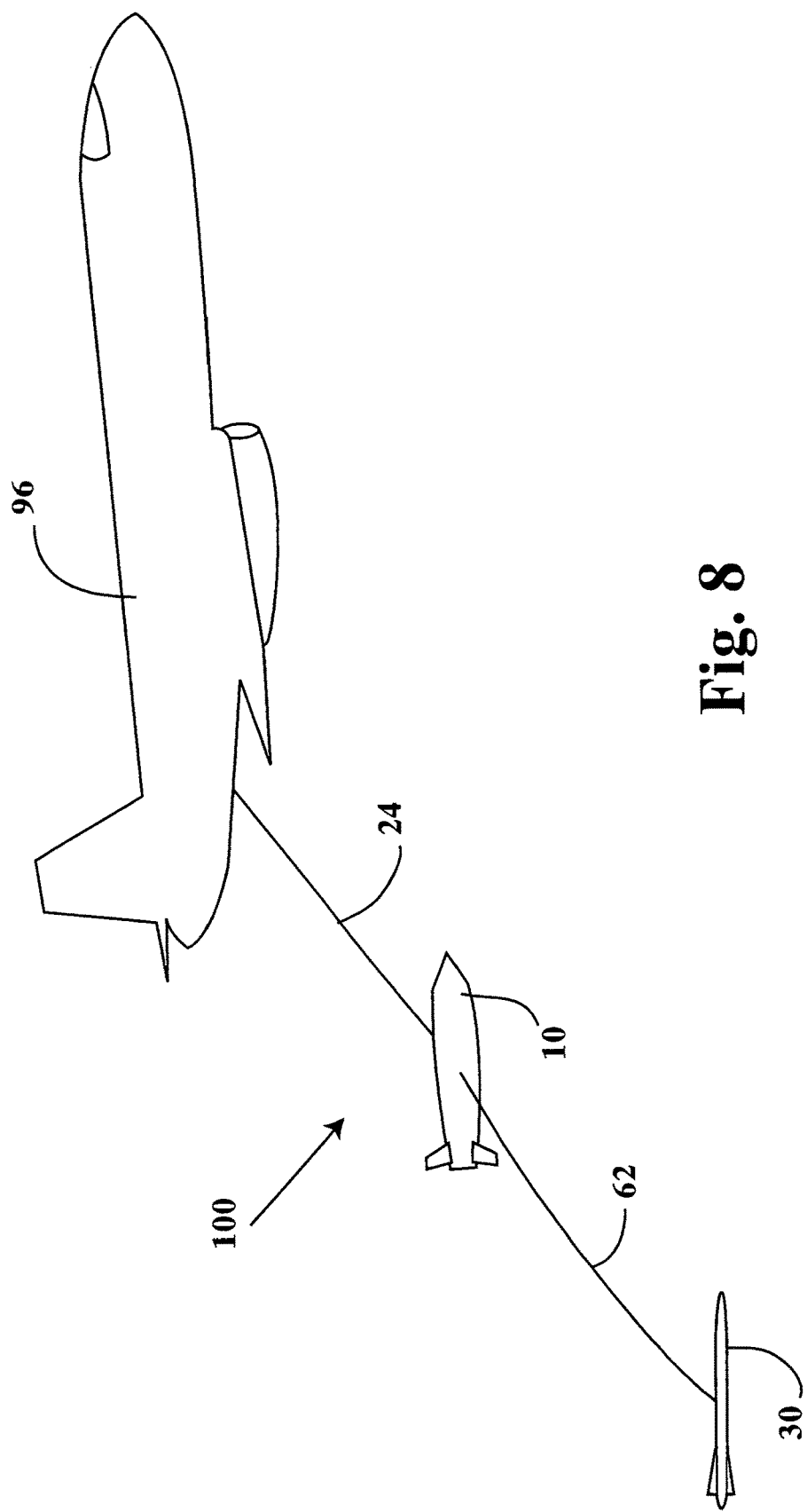
FIG. 8 is a perspective illustration of the tandem tow system of the present invention with the primary tow target being deployed after the deployment of the secondary tow target.

In FIG. 8, primary tow target 10 has just been launched from aircraft 96 and is connected to aircraft 96 by cable 24. Cable 24 is attached to the tow launcher or to a centerline tow connection at the rear of the aircraft.

Figure 9:
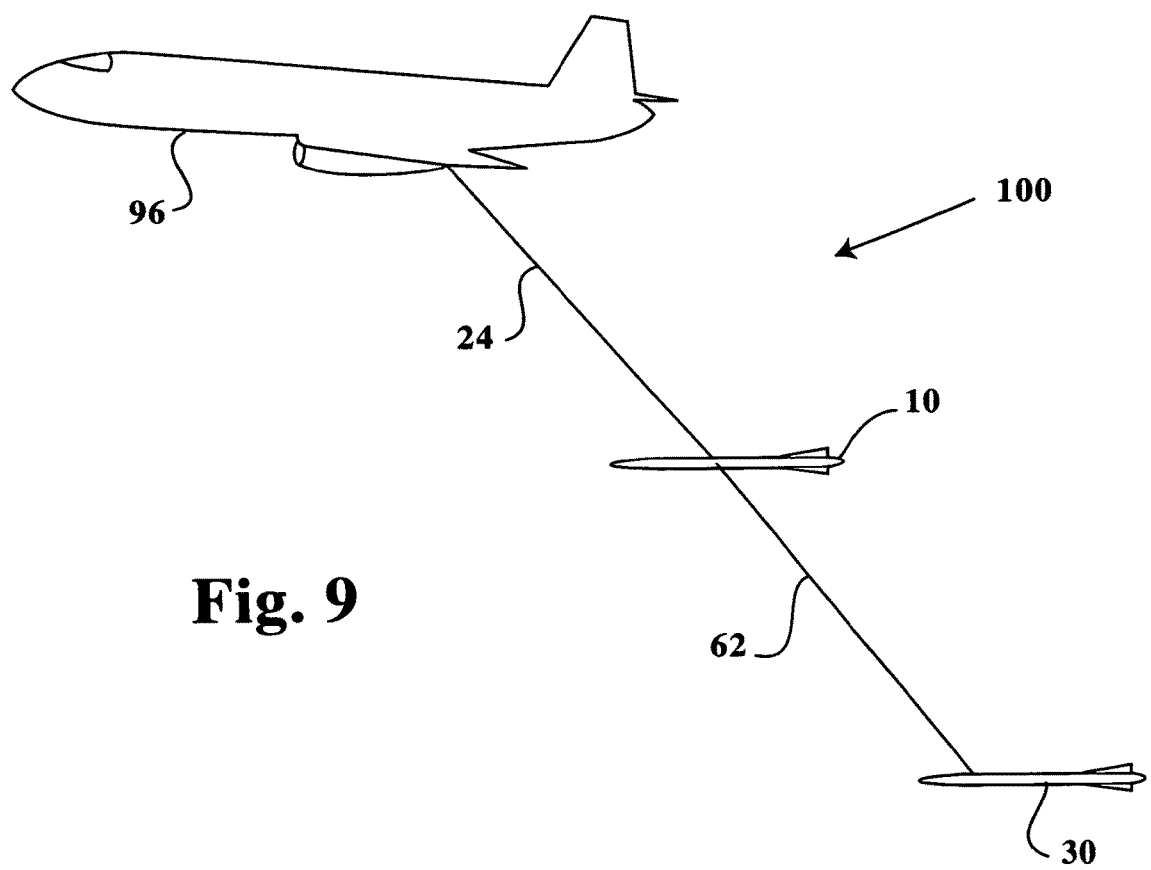
FIG. 9 is a perspective illustration of the tow system of the present invention with the primary and secondary tow targets being fully deployed from the towing aircraft.

In FIG. 9, the primary tow target 10 and the secondary tow target 30 are shown after having been fully deployed from the towing aircraft 96.

The shape of the tow targets is such that they are inherently aerodynamically stable. By "stable", it is meant that the targets will return to their original roll, pitch and yaw positions when pulsed by moments about those axes.

In operation, the secondary tow target is first launched from the aircraft and reeled out behind the primary tow target. Next, the primary tow target is launched from and reeled out behind the towing aircraft. Since the mother tow reel 16 is disposed at the primary tow target's center of gravity, the aircraft 13 can impart only translation forces to the primary target. Further, the cable yoke 80, lugs 56A, 56B and slide ring 82 provide a connecting and force adjusting means so that in operation the line of force from the secondary tow target to the primary tow target is constantly directed through the center of gravity of the primary tow target. As such, only translation forces are imparted from the secondary tow target to the primary tow target. Thus, pitching, yawing and rolling moments are not directed to the primary target and the tow targets may be towed behind the aircraft without destabilizing the flight of the aircraft.

The present invention was developed for a towed flight system in atmospheric air; however, the teachings can be applied to towed flight under water and for towing land or seagoing vessels provided that the towed vehicles are inherently stable in roll, pitch and yaw.

Thus, various modifications are possible without deviating from the spirit of the present invention. Accordingly, the scope of the invention is limited only by the claims which follow hereafter.

What is claimed is:

1. An apparatus for towing behind a powered towing mechanism in a fluid medium, comprising:
    an aerodynamically-shaped body, said aerodynamically-shaped body being formed by an outer skin;
    a mother tow reel, said mother tow reel being positioned at a center of gravity of said apparatus; and
    a cable connected to said mother tow reel;
    a slot formed on said outer skin, said cable extending through said slot for connecting to the powered towing mechanism;
    a first lug and a second lug positioned on said apparatus such that an axis line extends through said first lug, through said center of gravity and through said second lug; and
    a cable yoke connected to said first lug and to said second lug.

2. An apparatus according to claim 1, further comprising:
    a slide ring for sliding along said cable yoke.

3. An apparatus according to claim 2, further comprising:
    a second cable connected to said slide ring, said second cable being for connecting to another towed apparatus.

4. An apparatus according to claim 1 wherein:
    said first and second lugs are rotatable on the axis line that extends through said first and second lugs and the center of gravity of said apparatus.

5. A system for towing multiple objects through a fluid medium, comprising:
    a powered towing device;
    a first towed object connected by a first cable to said powered towing device;
    a second towed object connected by a second cable to said first towed object;
    means for connecting the second cable to the first towed object so that a line of force extending from the second cable, when the first and second towed objects are being towed through the fluid medium, is constantly directed through the center of gravity of the first towed object;

a mother tow reel positioned at the center of gravity of said first towed object, said mother tow reel being connected to said first cable;

a tow reel positioned at the center of gravity of said second towed object, said tow reel being connected to said second cable;

a first lug and a second lug connected to said first towed object such that a line passes through said first lug, through the center of gravity of said first towed object, and through said second lug;

a cable yoke connected to said first lug and to said second lug; and wherein said first cable connects to said first towed object at a center of gravity of said first towed object and said second cable connects to a center of gravity of said second towed object.

6. A system according to claim 5, further comprising:
a slide ring for sliding along said cable yoke, said slide ring being connected to said second cable.

7. A system according to claim 6, wherein:
said powered towing device has means for launching said first towed object and has means for launching said second towed object.

8. A system according to claim 7, wherein said powered towing device is an aircraft and said first towed object is a first tow target and said second towed object is a second tow target.

9. A system for towing targets in tandem behind an aircraft in an aerodynamically stable manner, comprising:

a primary tow target having a mother tow reel disposed at the center of gravity of the primary target, said mother tow reel being connected to a first cable for reeling the primary target out behind the aircraft when the primary target is launched from the aircraft;

a secondary tow target having a tow reel disposed at the center of gravity of the secondary target, said tow reel being connected to a second cable for reeling the secondary target out behind the primary target when the secondary target is launched from the aircraft; and means for connecting the second cable to the primary target so that a line of force extending from the second cable, after launching the secondary tow target from the aircraft, is always directed through the center of gravity of the primary tow target, said means for connecting comprising:

a pair of lugs positioned on said primary tow target such that an axis line passes through the pair of lugs and the center of gravity of said primary tow target;

a cable yoke connected to said pair of lugs; and a slide ring which is slidable on said cable yoke, said slide ring being connected to said second cable.

10. A system according to claim 9, wherein said primary tow target and said secondary tow target have an aerodynamic shape.

* * * * *